(12) United States Patent
Hu et al.

(10) Patent No.: US 8,699,640 B2
(45) Date of Patent: Apr. 15, 2014

(54) TRANSMITTER COMPENSATION IN DECODING OF INTENSITY MODULATED OPTICAL OFDM WITH DIRECT DETECTION

(75) Inventors: Junqiang Hu, Princeton, NJ (US); Dung-Huy Han, Davis, CA (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1094 days.

(21) Appl. No.: 12/630,167

(22) Filed: Dec. 3, 2009

(65) Prior Publication Data

US 2010/0142637 A1 Jun. 10, 2010

Related U.S. Application Data

(60) Provisional application No. 61/119,437, filed on Dec. 3, 2008.

(51) Int. Cl.
*H04L 25/08* (2006.01)

(52) U.S. Cl.
USPC .......... 375/346; 375/260; 375/267; 455/63.1; 455/296; 398/136; 398/174; 398/208

(58) Field of Classification Search
CPC .............. H04L 27/265; H04L 27/2614; H04L 27/2623; H04L 27/2649

USPC ................. 375/260, 267, 346, 349, 350, 351; 398/136, 137, 159, 174, 207, 208, 209; 455/63.1, 296; 370/208, 210

See application file for complete search history.

(56) References Cited

U.S. PATENT DOCUMENTS

| | | | | |
|---|---|---|---|---|
| 6,314,146 | B1 * | 11/2001 | Tellado et al. | 375/346 |
| 8,170,516 | B2 * | 5/2012 | Dehos et al. | 455/239.1 |
| 2005/0259721 | A1 * | 11/2005 | Kawamoto et al. | 375/144 |

FOREIGN PATENT DOCUMENTS

| | | | | |
|---|---|---|---|---|
| WO | WO 2006/038052 | * | 4/2006 | H04L 27/26 |
| WO | WO 2007/025346 | * | 3/2007 | H04B 10/04 |

* cited by examiner

*Primary Examiner* — Sophia Vlahos
(74) *Attorney, Agent, or Firm* — Joseph Kolodka

(57) ABSTRACT

A method by an optical OFDM receiver includes converting a received optical signal to an electrical signal, deriving a digital signal from the electrical signal, and emulating, with an iterative OFDM demodulator responsive to the digital signal, a transmitter effect in the received signal of lower peak clipping and top peak distortion and applying the transmitter effect to the received signal and a decision-made signal for estimating an error function to be applied to a demodulation of the received optical signal.

2 Claims, 1 Drawing Sheet

TRANSMITTER COMPENSATION IN DECODING OF INTENSITY MODULATED OPTICAL OFDM WITH DIRECT DETECTION

This application claims the benefit of U.S. Provisional Application No. 61/119,437, entitled "Optimal DC Bias for IM/DD Optical OFDM System with Iterative Decoding", filed on Dec. 3, 2008, the contents of which is incorporated by reference herein.

BACKGROUND OF THE INVENTION

The present invention relates generally to optical communications, and more particularly, to transmitter compensation in decoding of intensity modulated optical OFDM with direct detection.

Orthogonal Frequency Division Multiplexing (OFDM) is a promising technology in optical transmission because of its tolerance to chromatic dispersion (CD) and polarization mode dispersion (PMD). Compared to other modulation schemes and coherent detection, intensity modulation (IM) with direct detection (DD) has the advantage of reduced system complexity and cost. Because of the modulator and detector non-linearity, and the sensitivity of OFDM signal to this non-linearity, for intensity modulation with direct detection, IM/DD, it is usually good to limit the modulating signal and the received optical signal in a certain (small) range. Moreover, intensity modulation requires the signal to be DC-biased, which further limits the signal amplitude. This leads to inefficient use of the optical power, which further reduces the signal to noise ratio (SNR). Lowering the DC level will cause signal clipping, which results in worse performance.

One solution to the inefficient use of optical power is to limit the signal within the linear range of the modulator (including the amplifier) and the detector. Another approach is to avoid DC bias by clipping all the negative amplitude to increase the signal range, but this doubles the signal bandwidth.

Accordingly, there is a need for a method which increases the optical power to increase the noise tolerance, with improved system performance (lower bit-error-ratio at the same noise level).

SUMMARY OF THE INVENTION

In one aspect of the invention, a method by an optical OFDM receiver includes converting a received optical signal to an electrical signal, obtaining a digital signal from the electrical signal, and deriving, with an iterative OFDM demodulator responsive to the digital signal, a transmitter effect in the received signal of lower peak clipping and top peak distortion and applying the transmitter effect to the received signal and a decision-made signal for estimating an error function to be applied to a demodulation of the received optical signal. In a preferred embodiment, the decision made signal is derived from a decision module responsive to a multiplier adjustment of an OFDM demodulation of the digital signal for either outputting the adjustment to the OFDM demodulation of the digital signal or passing the adjustment to the OFDM demodulation of the digital signal to a non-linear module in parallel with a multiplier adjustment. The non-linear module includes an emulating effect of amplification and modulation in transmission generation of the received optical signal. The iterative OFDM demodulator includes adding the output from the non-linear module and the multiplier adjustment to derive the error function.

In an alternative aspect of the invention, an optical OFDM receiver includes a direct optical detector for converting a received optical signal to an electrical signal, a converter for converting a digital signal from the electrical signal, and an iterative OFDM demodulator responsive to the digital signal for deriving a transmitter effect in the received signal of lower peak clipping and top peak distortion and applying the transmitter effect to the received signal and a decision-made signal for estimating an error function to be applied to a demodulation of the received optical signal. In a preferred embodiment the iterative OFDM demodulator includes a first OFDM demodulator for converting the received electrical signal from a time domain to a frequency domain, a first multiplier for adjusting the frequency domain signal, a decision module responsive to the first multiplier for deriving original signal in transmission of the received signal, an OFDM modulator responsive to the decision module for recovering the received signal that was transmitted, a non-linear module responsive to the OFDM modulator for or emulating effect of amplification and modulator in transmitter sending the received signal, a second multiplier responsive to the OFDM modulator for adjusting the recovered received signal, a first adder responsive to the non-linear module and second multiplier, a second OFDM demodulator responsive to the adder for deriving the error function, and a second adder responsive to the second OFDM demodulator and the first OFDM demodulator for adding the error function to the received signal in the frequency domain from the first OFDM demodulator, the second adder being coupled to the first multiplier.

BRIEF DESCRIPTION OF DRAWINGS

These and other advantages of the invention will be apparent to those of ordinary skill in the art by reference to the following detailed description and the accompanying drawings.

DETAILED DESCRIPTION

The invention is directed to using intensity modulation and direct detection, with an optimally tuned DC bias at the modulator side, to clip the lower-peak of the signal to certain degree, and allow the higher-peak to be in the non-linear area. Then at the receiver side, an iterative decoder demodulates the signal, makes a decision from the demodulation results, and calculates the error function from this decision. The error function is added to the demodulated signal and another decision is made again for improved performance. Several iterative rounds may be applied for increased performance.

Figure 1:
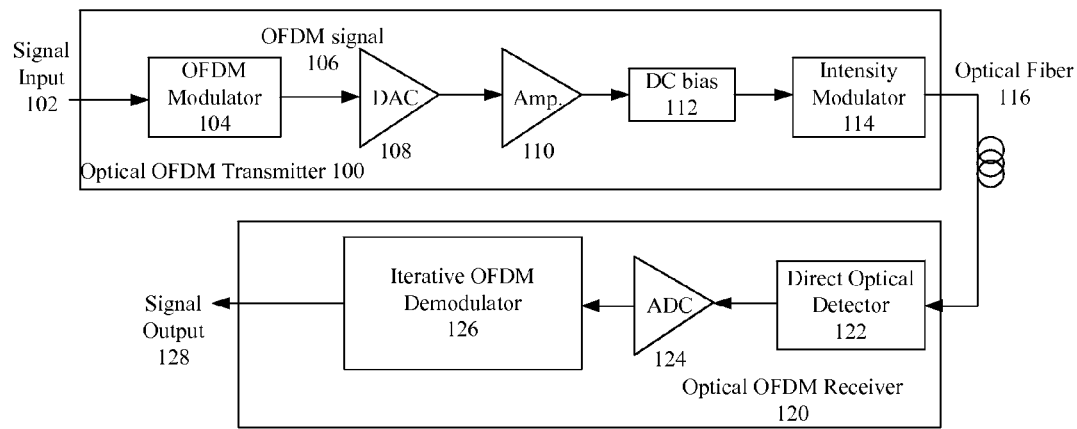
FIG. 1 is a block diagram of an exemplary intensity modulation with direct detection OFDM transmission system in accordance with the invention.

FIG. 1 is a block diagram of an exemplary transmission system in accordance with the invention. Digital signal 102 is input to OFDM modulator 104, which uses digital signal processing to convert the signal from frequency domain to time domain. The generated digital OFDM signal 106 is further converted to analog signal by digital-to-analog converter (DAC) 108, and amplified by amplifier 110, then added a DC bias through DC bias 112 to drive the intensity modulator 114. This intensity modulator can be a direct-modulating laser, or other modulator with external laser input. The output signal from intensity modulator 114 is injected to optical fiber 116 for transmission, which may also pass through several optical amplifiers. Within the optical OFDM receiver 120, a direct optical detector 122 converts the optical signal to electrical domain and further sampled by analog-to-digital converter 124 to digital signal, and demodulated through iterative OFDM demodulator 126, which uses decision feed-back compensation to the demodulated signal. The output from iterative OFDM demodulator is the final decoded signal 128.

Figure 2:
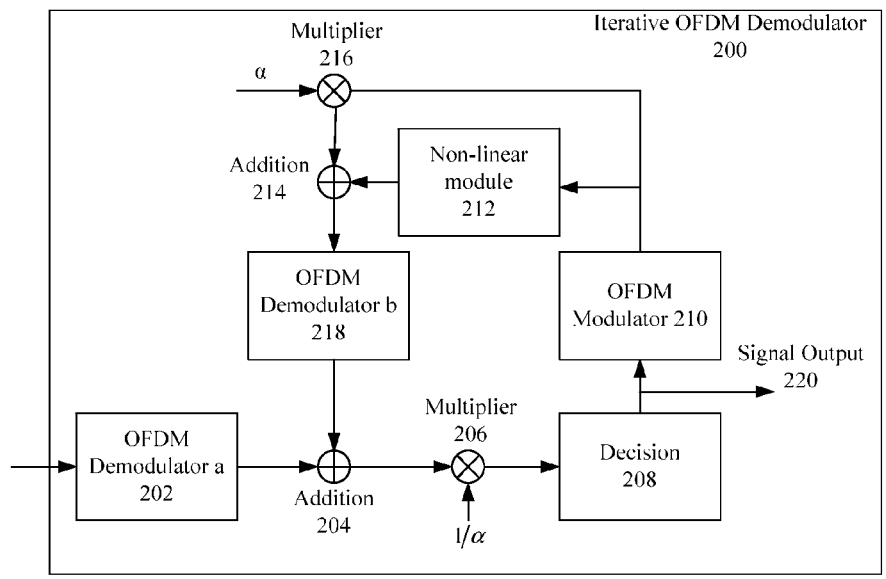
FIG. 2 is a block diagram of an iterative OFDM demodulator employed in FIG. 1.

The detailed architecture of the iterative OFDM demodulator is shown in FIG. 2. The output digitized signal from ADC 124 is first passed to OFDM demodulator a 202, to convert the signal from time domain to frequency domain. For the first step, this signal is adjusted by a constant 1/α through multiplier 206, and fed into the decision module 208. Signal output from 208 is supposed to be the original signal, so this signal is further modulated by OFDM modulator 210 to recover the transmitted signal. Output from OFDM modulator 210 goes through two paths: one is adjusted by non-linear module 212, which emulates the effect of the amplifier and the modulator in the transmitter side; the second one is adjusted by constant α. The two signals are added together and input to another OFDM demodulator b 218, to get the error function. This estimated error is added to signal from OFDM demodulator a 202, as the compensated signal, then through multiplier 206 to decision module 208. Now the output from decision module 208 can be output signal 220, or pass through another iteration.

With this system described above, we further adjust the DC bias and signal amplitude of that into intensity modulator 114, to get the optimal performance. The DC bias will be a certain voltage that results in clipped bottom peak of the OFDM signal; the increased signal amplitude results in distorted top peak of the OFDM signal. But the performance after the iterative OFDM demodulator is much better than that without clipping/distorting.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method executed by an optical OFDM receiver comprising:
converting a received optical signal to an electrical signal, obtaining a digital signal from the electrical signal, and deriving, with an iterative OFDM demodulator responsive to the digital signal, amplification and modulation effects of a transmission side which generates and transmits the received signal and applying the amplification and modulation effects to the digital signal and a decision-made signal which is used to estimate an error function applied to a demodulation of the digital signal;

wherein the decision-made signal is derived from a decision module responsive to a multiplier adjustment of an OFDM demodulation of the digital signal, outputting by the decision module a decision signal or passing the decision signal to an OFDM modulator, supplying by the OFDM modulator the decision-made signal to a non-linear module and a multiplier, emulating by the non-linear module the amplification and modulation effects of the transmission side which generates and transmits the received signal; and adding by the iterative OFDM demodulator an output of the non-linear module to an output of the multiplier to estimate said error function.

2. An optical OFDM receiver comprising:
a direct optical detector configured to convert a received optical signal to an electrical signal, a converter configured to convert the electrical signal to a digital signal, and an iterative OFDM demodulator responsive to the digital signal configured to derive amplification and modulation effects of a transmission side which transmits the received signal and applying the amplification and modulation effects to the digital signal and a decision-made signal which is used to estimate an error function applied to a demodulation of the digital signal;

wherein the iterative OFDM demodulator comprises:
a first OFDM demodulator configured to convert the digital signal from a time domain to a frequency domain,
a first multiplier configured to adjust the frequency domain signal,
a decision module responsive to the first multiplier and configured to derive an originally transmitted signal contained in the digital signal,
an OFDM modulator responsive to the decision module and configured to recover a modulated signal that was transmitted,
a non-linear module responsive to the OFDM modulator and configured to emulate the amplification and modulation effects of the transmission side which transmits the received signal,
a second multiplier responsive to the OFDM modulator and configured to adjust the recovered signal,
a first adder responsive to the non-linear module and second multiplier,
a second OFDM demodulator responsive to the first adder and configured to estimate the error function, and
a second adder responsive to the second OFDM demodulator and the first OFDM demodulator and configured to add the error function to the frequency domain signal, the second adder being coupled to the first multiplier.

* * * * *